(12) United States Patent
Li et al.

(10) Patent No.: US 12,321,304 B2
(45) Date of Patent: Jun. 3, 2025

(54) DATA TRANSMISSION METHOD, SYSTEM AND APPARATUS, AND DEVICE AND COMPUTER-READABLE STORAGE MEDIUM

(71) Applicant: SUZHOU METABRAIN INTELLIGENT TECHNOLOGY CO., LTD., Jiangsu (CN)

(72) Inventors: Xingyuan Li, Jiangsu (CN); Jian Cui, Jiangsu (CN); Jiang Wang, Jiangsu (CN); Huajin Sun, Jiangsu (CN); Shuqing Li, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/710,595

(22) PCT Filed: Mar. 23, 2023

(86) PCT No.: PCT/CN2023/083385
§ 371 (c)(1),
(2) Date: May 15, 2024

(87) PCT Pub. No.: WO2023/179714
PCT Pub. Date: Sep. 28, 2023

(65) Prior Publication Data
US 2025/0004976 A1 Jan. 2, 2025

(30) Foreign Application Priority Data
Mar. 24, 2022 (CN) .......................... 202210292391.3

(51) Int. Cl.
*G06F 13/24* (2006.01)
*G06F 13/42* (2006.01)

(52) U.S. Cl.
CPC .. *G06F 13/4221* (2013.01); *G06F 2213/0026* (2013.01)

(58) Field of Classification Search
CPC ..................... G06F 13/4221; G06F 2213/0026
See application file for complete search history.

(56) References Cited

U.S. PATENT DOCUMENTS

| 8,805,918 B1 * | 8/2014 | Chandrasekaran ... G06F 3/0619 709/200 |
| 2017/0329735 A1 * | 11/2017 | Garg ................... G06F 13/4282 |
| 2020/0265000 A1 * | 8/2020 | Nagata .................... G06F 13/26 |

FOREIGN PATENT DOCUMENTS

| CN | 105068953 A | 11/2015 |
| CN | 106027423 A | 10/2016 |

(Continued)

*Primary Examiner* — Henry Tsai
*Assistant Examiner* — Kim T Huynh
(74) *Attorney, Agent, or Firm* — IPro, PLLC (57) ABSTRACT

Disclosed are a data transmission method, system and apparatus, and a device and a computer-readable storage medium. The method is applied to a data transmission system, and the system comprises a host device, devices for transmission and a transmission initiation device, wherein the host device can hold an initial configuration table, which contains device information of the devices for transmission, and sends the table to the transmission initiation device for selection and completion; the transmission initiation device fills in, according to its own demand, an initial configuration table of a target device with necessary information for establishing transmission, and returns an obtained complete configuration table to the host device; and the host device then configures the target device by using a complete information table, and returns the complete information table to the transmission initiation device after completing the configuration.

18 Claims, 2 Drawing Sheets

(56) References Cited

FOREIGN PATENT DOCUMENTS

| | | | |
|---|---|---|---|
| CN | 114138702 | A | 3/2022 |
| CN | 114389947 | A | 4/2022 |
| JP | 2017097638 | A | 6/2017 |

* cited by examiner

FIG. 7

DATA TRANSMISSION METHOD, SYSTEM AND APPARATUS, AND DEVICE AND COMPUTER-READABLE STORAGE MEDIUM

CROSS-REFERENCE TO RELATED APPLICATION

This disclosure claims the priority to Chinese Patent Application No. 202210292391.3, filed to the China National Intellectual Property Administration on Mar. 24, 2022 and entitled "DATA TRANSMISSION METHOD, SYSTEM, APPARATUS, DEVICE AND COMPUTER READABLE STORAGE MEDIA", the disclosure of which is hereby incorporated by reference in its entirety.

FIELD

The disclosure relates to the field of device communication, and more particularly, to a data transmission method, a system, an apparatus, a device and a computer-readable storage medium.

BACKGROUND

In the peripheral component interconnect express (PCIe, a high-speed serial computer extension bus standard) bus system, data transmission between endpoint devices (EP) on the bus may usually be performed under the control of the CPU of the host device. For example, the traditional PCIe point-to-point data transmission (PCIe P2P) allows two endpoint devices to transmit data under the control of the host device, and the host device to handle interrupts and other operations during the data transmission. However, the above PCIe point-to-point data transmission process tends to increase data transmission delay between endpoint devices. In addition, this process also requires the host device to install supporting transmission software, which tends to increase the maintenance cost of the PCIe bus system. Therefore, it can be considered to directly migrate the data transmission process to the endpoint device, so that the transmission control logic is completely completed by the endpoint device itself. However, the migration brings a new problem, that is, if the endpoint device that needs to initiate transmission communicates data with the target endpoint device, it is necessary to obtain relevant device information in the configuration space of the target endpoint device and perform relevant configurations. However, the endpoint device cannot actually access the configuration space of the other endpoint device. As a result, the transmission initiating device cannot obtain the device information of the target endpoint device and configure the target endpoint device, and thus cannot carry out subsequent PCIe point-to-point data transmission processes.

SUMMARY

An objective of the present disclosure is to provide a data transmission method, a system, an apparatus, a device, and a computer-readable storage medium, in which a host device can assist a transmission initiating device to configure a target device, so as to ensure that PCIe devices can realize autonomous point-to-point transmission between devices.

To solve the above technical problem, the present disclosure provides a data transmission method applied to a data transmission system, the data transmission system includes a host device, a to-be-transmitted device and a transmission initiating device, the to-be-transmitted device and the transmission initiating device both are PCIe devices, and the method includes:

sending, by the host device, an initial configuration table of the to-be-transmitted device to the transmission initiating device, where the initial configuration table includes device information of the to-be-transmitted device;

determining, by the transmission initiating device, a target device in to-be-transmitted devices based on the device information, filling in transmission configuration information in an initial configuration table of the target device to obtain a complete configuration table, and sending the complete configuration table to the host device;

configuring, by the host device, the target device based on the transmission configuration information, updating a configuration status bit preset in the complete configuration table to a success status, and sending the updated complete configuration table to the transmission initiating device; and performing, by the transmission initiating device, PCIe point-to-point data transmission with the target device by using the complete configuration table when the configuration status bit is determined to be in the success status.

In some embodiments, the filling in the transmission configuration information in the initial configuration table of the target device to obtain the complete configuration table includes:

determining, by the transmission initiating device, whether the target device needs to be enabled based on the initial configuration table of the target device;

updating an enable flag bit preset in the initial configuration table to a to-be-enabled status when the target device needs to be enabled;

reading interrupt types supported by the target device from the initial configuration table, selecting a target interrupt type from the interrupt types, and filling in the target interrupt type in the initial configuration table;

filling in preset interrupt configuration information in the initial configuration table when the target interrupt type is an MSI interrupt, where the interrupt configuration information includes an MSI interrupt address, interrupt data and a number of interrupts; and setting the filled initial configuration table as the complete configuration table.

In some embodiments, the configuring, by the host device, the target device based on the transmission configuration information includes:

reading, by the host device, the enable flag bit, the target interrupt type and the interrupt configuration information from the transmission configuration information;

configuring a command register in configuration space of the target device to enable a memory space bit and a bus master bit when the enable flag bit is in the to-be-enabled status; and configuring an MSI function register in the target device by using the interrupt configuration information when the target interrupt type is the MSI interrupt.

In some embodiments, before the host device sends the initial configuration table of the to-be-transmitted device to the transmission initiating device, the method further includes:

extracting, by the host device, the device information from the configuration space of the to-be-transmitted device, and creating the initial configuration table by using the device information.

In some embodiments, sending, by the host device, the initial configuration table of the to-be-transmitted device to the transmission initiating device includes:

constructing, by the host device, a first control command, sending the first control command to a control command submission queue, and updating a status of a doorbell register, where the first control command includes a storage address of the initial configuration table in a memory of the host device;

extracting, by the transmission initiating device, the first control command from the control command submission queue, and obtaining the initial configuration table from the memory based on the storage address when an update of the status of the doorbell register is detected.

Correspondingly, the sending the complete configuration table to the host device includes:

constructing, by the host device, a second control command, sending the second control command to the control command submission queue, and updating the status of the doorbell register, where the second control command includes a target write address of the complete configuration table in the memory;

extracting, by the transmission initiating device, the second control command from the control command submission queue, and writing the complete configuration table into the memory based on the target write address when a change of the status of the doorbell register is detected.

In some embodiments, the first control command is a set feature command, and the obtaining the initial configuration table from the memory based on the storage address includes:

determining, by the transmission initiating device, whether a feature identifier in the set feature command is a first preset value;

reading the storage address from a data pointer of the set feature command and obtaining the initial configuration table from the memory based on the storage address when the feature identifier in the set feature command is the first preset value.

Correspondingly, the second control command is a get feature command, and the writing the complete configuration table into the memory based on the target write address includes:

determining, by the transmission initiating device, whether a feature identifier in the get feature command is a second preset value;

reading the target write address from a data pointer of the get feature command and writing the complete configuration table into the memory based on the target write address when the feature identifier in the get feature command is the second preset value.

In some embodiments, after the obtaining the initial configuration table from the memory based on the storage address, the method further includes:

sending, by the transmission initiating device, a first execution result of executing the set feature command to the host device through a control command response queue.

Correspondingly, after the writing the complete configuration table into the memory based on the target write address, the method further includes:

sending, by the transmission initiating device, a second execution result of executing the get feature command to the host device through the control command response queue.

The present disclosure further provides a data transmission method, which is applied to a host device in a data transmission system, the data transmission system includes a host device, a to-be-transmitted device and a transmission initiating device, and the method includes:

sending an initial configuration table of the to-be-transmitted device to the transmission initiating device, where the initial configuration table includes device information of the to-be-transmitted device;

obtaining a complete configuration table sent by the transmission initiating device, where the complete configuration table is obtained by the transmission initiating device determining a target device in to-be-transmitted devices based on the device information and filling in transmission configuration information in an initial configuration table of the target device;

configuring the target device based on the transmission configuration information, updating a configuration status bit preset in the complete configuration table to a success status, and sending the updated complete configuration table to the transmission initiating device, so that the transmission initiating device performs PCIe point-to-point data transmission with the target device by using the complete configuration table when the configuration status bit is determined to be in the success status.

In some embodiments, the configuring the target device based on the transmission configuration information includes:

reading an enable flag bit, a target interrupt type and interrupt configuration information from the transmission configuration information;

configuring a command register in configuration space of the target device to enable a memory space bit and a bus master bit when the enable flag bit is in a to-be-enabled status; and configuring an MSI function register in the target device by using the interrupt configuration information when the target interrupt type is an MSI interrupt.

In some embodiments, before the sending the initial configuration table of the to-be-transmitted device to the transmission initiating device, the method further includes:

extracting the device information from the configuration space of the to-be-transmitted device and creating the initial configuration table by using the device information.

In some embodiments, the sending the initial configuration table of the to-be-transmitted device to the transmission initiating device includes:

constructing a first control command, sending the first control command to a control command submission queue, and updating a status of a doorbell register, where the first control command includes a storage address of the initial configuration table in a memory of the host device.

Correspondingly, the obtaining the complete configuration table sent by the transmission initiating device includes:

constructing a second control command, sending the second control command to the control command submission queue, and updating the status of the doorbell register, where the second control command includes a target write address of the complete configuration table in the memory.

The present further provides a data transmission method, which is applied to a transmission initiating device in a data transmission system, the data transmission system includes a host device, a to-be-transmitted device and a transmission initiating device, and the method includes:

obtaining an initial configuration table of the to-be-transmitted device which is sent by the host device, where the initial configuration table includes device information of the to-be-transmitted device;

determining a target device in to-be-transmitted devices based on the device information, filling in transmission configuration information in the initial configuration table of the target device to obtain a complete configuration table, and sending the complete configuration table to the host device;

obtaining an updated complete configuration table sent by the host device, where the complete configuration table is updated by the host device configuring the target device based on the transmission configuration information and updating a configuration status bit preset in the complete configuration table to a success status;

performing PCIe point-to-point data transmission with the target device by using the complete configuration table when the configuration status bit is determined to be in the success status.

In some embodiments, the filling in the transmission configuration information in the initial configuration table to obtain the complete configuration table of the target device includes:

determining whether the target device needs to be enabled based on the initial configuration table of the target device;

updating an enable flag bit preset in the initial configuration table to a to-be-enabled status when the target device needs to be enabled;

reading interrupt types supported by the target device from the initial configuration table, selecting a target interrupt type from the interrupt types, and filling in the target interrupt type in the initial configuration table;

filling in preset interrupt configuration information in the initial configuration table when the target interrupt type is an MSI interrupt, where the interrupt configuration information includes an MSI interrupt address, interrupt data and a number of interrupts; and  setting the filled initial configuration table as the complete configuration table.

In some embodiments, the obtaining the initial configuration table of the to-be-transmitted device which is sent by the host device includes:

extracting a first control command from a control command submission queue when an update of a status of a doorbell register is detected, where the first control command is sent by the host device to the control command submission queue, and the first control command includes a storage address of the initial configuration table in a memory of the host device;

obtaining the initial configuration table from the memory based on the storage address.

Correspondingly, the sending the complete configuration table to the host device includes:

extracting a second control command from the control command submission queue when a change of the status of the doorbell register is detected, where the second control command is sent by the host device to the control command submission queue, and the second control command includes a target write address of the complete configuration table in the memory; and  writing the complete configuration table to the memory based on the target write address.

In some embodiments, the first control command is a set feature command, and the obtaining the initial configuration table from the memory based on the storage address includes:

determining whether a feature identifier in the set feature command is a first preset value;

reading the storage address from a data pointer of the set feature command and obtaining the initial configuration table from the memory based on the storage address when the feature identifier in the set feature command is the first preset value; and  where the second control command is a get feature command, and the writing the complete configuration table into the memory based on the target write address includes:

determining whether a feature identifier in the get feature command is a second preset value; and  reading the target write address from a data pointer of the get feature command and writing the complete configuration table to the memory based on the target write address when the feature identifier in the get feature command is the second preset value.

In some embodiments, after the obtaining the initial configuration table from the memory based on the stored address, the method further includes:

sending a first execution result of executing the set feature command to the host device through a control command response queue; and  after the writing the complete configuration table into the memory based on the target write address, the method further includes:

sending a second execution result of executing the get feature command to the host device through the control command response queue.

The present disclosure further provides a data transmission system including a host device, a to-be-transmitted device and a transmission initiating device, the to-be-transmitted device and the transmission initiating device are PCIe devices,  the host device is configured for sending an initial configuration table of the to-be-transmitted device to the transmission initiating device, the initial configuration table including device information of the to-be-transmitted device, configuring the target device based on transmission configuration information in a complete configuration table returned by the transmission initiating device, updating a configuration status bit preset in the complete configuration table to a success status, and sending the updated complete configuration table to the transmission initiating device;

the transmission initiating device is configured for determining a target device in to-be-transmitted devices based on the device information in the initial configuration table, filling in the transmission configuration information in the initial configuration table of the target device to obtain a complete configuration table, and sending the complete configuration table to the host device, and performing PCIe point-to-point data transmission with the target device by using the complete configuration table when a configuration status bit in the complete configuration table is determined to be in the success status; and the to-be-transmitted device is configured for performing PCIe point-to-point data transmission with the transmission initiating device after being configured by the host device.

In some embodiments, the transmission initiating device is further configured for determining whether the target device needs to be enabled based on the initial configuration table of the target device, updating an enable flag bit preset in the initial configuration table to a to-be-enabled status when the target device needs to be enabled, reading interrupt types supported by the target device from the initial configuration table, selecting a target interrupt type from the interrupt types, and filling in the target interrupt type in the initial configuration table, filling in preset interrupt configuration information in the initial configuration table when the target interrupt type is an MSI interrupt, the interrupt configuration information including an MSI interrupt address, interrupt data and a number of interrupts, and setting the filled initial configuration table as the complete configuration table.

The present disclosure further provides a data transmission apparatus, the data transmission apparatus is applied to a host device in a data transmission system, the data transmission system includes a host device, a to-be-transmitted device and a transmission initiating device, and the apparatus includes:

an initial configuration table sending module for sending an initial configuration table of the to-be-transmitted device to the transmission initiating device, where the initial configuration table includes device information of the to-be-transmitted device;

a complete configuration table obtaining module for obtaining a complete configuration table sent by the transmission initiating device, where the complete configuration table is obtained by the transmission initiating device determining a target device in to-be-transmitted devices based on the device information and filling in the transmission configuration information in an initial configuration table of the target device; and an update configuration table sending module for configuring the target device based on the transmission configuration information, updating a configuration status bit preset in the complete configuration table to a success status, and sending the updated complete configuration table to the transmission initiating device, so that the transmission initiating device performs a PCIe point-to-point data transmission with the target device by using the complete configuration table when the configuration status bit is determined to be the successful status.

In some embodiments, the update configuration table sending module includes:

a first information reading module for reading an enable flag bit, a target interrupt type and interrupt configuration information;

a first processing module for configuring a command register in configuration space of the target device to enable a memory space bit and a bus master bit when the enable flag bit is in a to-be-enabled status; and a second processing module for configuring an MSI function register in the target device by using the interrupt configuration information when the target interrupt type is an MSI interrupt.

In some embodiments, the initial configuration table sending module includes:

a first control command constructing module for constructing a first control command, sending the first control command to a control command submission queue, and updating a status of a doorbell register, where the first control command includes a storage address of the initial configuration table in a memory of the host device.

Correspondingly, the complete configuration table obtaining module includes:

a second control command constructing module for constructing a second control command, sending the second control command to the control command submission queue, and updating the status of the doorbell register, where the second control command includes a target write address of the complete configuration table in the memory.

The present disclosure further provides a data transmission apparatus, the data transmission apparatus is applied to a transmission initiating device in a data transmission system, the data transmission system includes a host device, a to-be-transmitted device and the transmission initiating device, and the apparatus includes:

an initial configuration table obtaining module for obtaining an initial configuration table of the to-be-transmitted device sent by the host device, where the initial configuration table includes device information of the to-be-transmitted device;

a complete configuration table sending module for determining a target device in to-be-transmitted devices based on the device information, filling in transmission configuration information in the initial configuration table of the target device to obtain a complete configuration table, and sending the complete configuration table to the host device;

an updated configuration table obtaining module for obtaining an updated complete configuration table sent by the host device, where the complete configuration table is updated by the host device configuring the target device based on the transmission configuration information and updating a configuration status bit preset in the complete configuration table to a success status;

a data transmission module for performing PCIe point-to-point data transmission with the target device by using the complete configuration table when the configuration status bit is determined to be in the success status.

In some embodiments, the complete configuration table sending module includes:

a first update processing module for determining whether the target device needs to be enabled based on the initial configuration table of the target device, and updating an enable flag bit preset in the initial configuration table to a to-be-enabled status when the target device needs to be enabled;

a second update processing module for reading interrupt types supported by the target device from the initial configuration table, selecting a target interrupt type from the interrupt types, and filling in the target interrupt type in the initial configuration table;

a third update processing module for filling in preset interrupt configuration information in the initial configuration table when the target interrupt type is an MSI interrupt, where the interrupt configuration information includes an MSI interrupt address, interrupt data and a number of interrupts; and a fourth update processing module for setting the filled initial configuration table as the complete configuration table.

In some embodiments, the initial configuration table obtaining module includes:

a first control command extracting module for extracting a first control command from a control command submission queue when an update of a status of a doorbell register is detected, where the first control command is sent by the host device to the control command submission queue, and the first control command includes a storage address of the initial configuration table in a memory of the host device; and obtaining module for obtaining the initial configuration table from the memory based on the storage address.

Correspondingly, the complete configuration table obtaining module includes:

a second control command extracting module for extracting a second control command from the control command submission queue when a change of the status of the doorbell register is detected, where the second control command is sent by the host device to the control command submission queue, and the second control command includes a target write address of the complete configuration table in the memory; and writing module for writing the complete configuration table to the memory based on the target write address.

In some embodiments, the first control command is a set feature command, and the obtaining module is configured for determining whether a feature identifier in the set feature command is a first preset value, reading the storage address from a data pointer of the set feature command and obtaining the initial configuration table from the memory based on the storage address when the feature identifier in the set feature command is the first preset value.

Correspondingly, the writing module is configured for determining whether a feature identifier in a get feature command is a second preset value, and reading the target write address from a data pointer of the get feature command and writing the complete configuration table to the memory based on the target write address when the feature identifier in the get feature command is the second preset value.

The present disclosure further provides an electronic device, including:

a memory for storing a computer program; and
a processor for executing the computer program to implement the above data transmission method.

The present disclosure further provides a non-transient computer-readable storage medium, the non-transient computer-readable storage medium stores a computer program, and the computer program implements the above data transmission method when loaded and executed by the processor.

The present disclosure provides a data transmission method applied to a data transmission system, the data transmission system includes a host device, a to-be-transmitted device and a transmission initiating device, the to-be-transmitted device and the transmission initiating device are PCIe devices, and the method includes: the host device sending an initial configuration table of the to-be-transmitted device to the transmission initiating device, the initial configuration table including device information of the to-be-transmitted device; the transmission initiating device determining the target device in to-be-transmitted devices based on the device information, filling in the transmission configuration information in the initial configuration table of the target device to obtain a complete configuration table, and sending the complete configuration table to the host device; the host device configuring the target device based on the transmission configuration information, updating a configuration status bit preset in the complete configuration table to a success status, and sending the updated complete configuration table to the transmission initiating device; the transmission initiating device performing PCIe point-to-point data transmission with the target device by using the complete configuration table when the configuration status bit is determined to be in the success status.

Therefore, in the present disclosure, the device information of the to-be-transmitted device may be held by the host device and saved in the corresponding initial configuration table, the host device may send the initial configuration table to the transmission initiating device, and the transmission initiating device may determine the target device in to-be-transmitted devices based on the device information in the table, which not only facilitates the transmission initiating device to locate the target device, but also effectively solves the problem that the transmission initiating device cannot obtain the device information of the target device. After the target device is determined, the transmission initiating device may continue to fill in the transmission configuration information necessary for PCIe point-to-point data transmission in the initial configuration table of the target device to obtain a complete configuration table, and then send the complete configuration table back to the host device, the host device may configure the target device based on the transmission configuration information in the complete configuration table, which effectively solves the problem that the transmission initiating device cannot configure the target device. After the target device is configured, the host device may update a configuration status bit preset in the complete configuration table to a success status, so as to enable the transmission initiator device to initiate PCIe point-to-point data transmission with the target device, which in turn lay a foundation for autonomous data transmission between the transmission initiator device and the target device. The present disclosure also provides a data processing method performed by a host device, a data processing method performed by a transmission initiating device, a data transmission system, an apparatus, an electronic device and a non-transitory computer-readable storage medium, which have the above beneficial effects.

BRIEF DESCRIPTION OF THE DRAWINGS

In order to explain the technical solutions in the embodiments of the present disclosure or the prior art more clearly, the figures that are required to describe the embodiments of the disclosure will be briefly described below. Apparently, the figures that are described below are merely a part of the embodiments of the disclosure, and a person skilled in the art can obtain other figures according to these figures without paying creative work.

DETAILED DESCRIPTION

In order to make the objects, the technical solutions and the advantages of the embodiments of the present disclosure clearer, the technical solutions of the embodiments of the present disclosure may be clearly and completely described below with reference to the drawings of the embodiments of the present disclosure. Apparently, the described embodiments are merely certain embodiments of the present disclosure, rather than all of the embodiments. All of the other embodiments that a person skilled in the art obtains on the basis of the embodiments of the present disclosure without paying creative work fall within the protection scope of the present disclosure.

Figure 1:
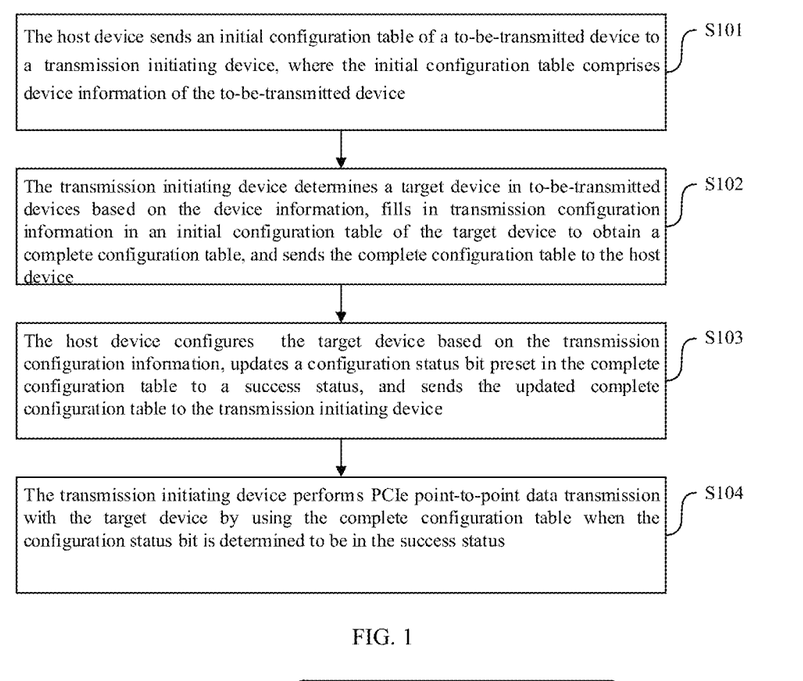
FIG. 1 is a flowchart of a data transmission method provided in an embodiment of the present disclosure.

In order to effectively configure a target endpoint device to ensure that a transmission initiating device can autonomously perform PCIe point-to-point data transmission with a target endpoint device. The present disclosure provides a data transmission method in which the host device can assist the transmission initiating device in configuring the target device to ensure that the PCIe device can achieve autonomous point-to-point transmission between devices. As shown in FIG. 1, FIG. 1 is a flowchart of a data transmission method provided in an embodiment of the present disclosure. The method is applied to a data transmission system, which includes a host device, to-be-transmitted devices and a transmission initiating device. It should be noted that both the to-be-transmitted devices and the transmission initiating device are PCIe devices. The embodiments of the present disclosure do not limit specific PCIe devices, and relevant technology of PCIe devices may be referred to. The method includes S101-104.

In S101, the host device sends an initial configuration table of the to-be-transmitted device to the transmission initiating device, where the initial configuration table includes device information of the to-be-transmitted device.

In the embodiment of the present disclosure, the host device may hold initial configuration table including the device information of the to-be-transmitted devices, and may send the configuration table to the transmission initiating device, so that the latter may select a target device by using the table and perform relevant configuration operations. The device information included in the initial configuration table is required for establishing PCIe point-to-point transmission with the to-be-transmitted device, and may include, for example, location information of the to-be-transmitted devices on the PCIe bus (PCI bus number, device number and device function number), PCI ID information (vendor ID, device ID, revision ID, Class Code), base address register value (BAR, Base Address Register), supportable interrupt information, etc., which may be set according to actual application requirements. It should be noted that the embodiments of the present disclosure do not limit the organization of the device information in the initial configuration table, which may be set according to actual application requirements. The embodiments of the present disclosure also do not limit the number of initial configuration tables that the host device may hold. It can be understood that the number is the same as the number of PCIe devices accessing the host device. The embodiments of the present disclosure also do not limit the specific method of setting the initial configuration table. For example, the initial configuration table may be set manually and then written into the host device, or the host device may automatically extract the above device information from the configuration space of the to-be-transmitted devices and automatically generate the initial configuration table based on the information. In the embodiment of the present disclosure, in order to improve the accuracy of the initial configuration table and convenience of generating the initial configuration table, the table may be automatically generated by the host device by using the device information extracted from the configuration space of the to-be-transmitted devices.

In one possible case, before the host device sends the initial configuration table of the to-be-transmitted devices to the transmission initiating device, the method may further include step 11.

In step 11, the host device extracts the device information from the configuration space of the to-be-transmitted devices and creates the initial configuration table by using the device information.

Further, it should be noted that the embodiment of the present disclosure does not limit the specific method of transmitting data between the host device and the transmission initiating device. For example, two devices may communicate through a host interface of a vendor-defined PCIe device. It is also possible to extend a certain standard PCIe host interface, such as an NVMe interface (non-transitory memory express) or VirtIO interface (semi-virtualized 10 interface), so that two devices can communicate through the extended standard PCIe interface, which may be set according to actual application requirements.

In S102, the transmission initiating device determines a target device in the to-be-transmitted devices based on the device information, fills in the transmission configuration information in the initial configuration table of the target device to obtain a complete configuration table, and sends the complete configuration table to the host device.

Apparently, the transmission initiating device may obtain the device information of the to-be-transmitted devices through the initial configuration table, and select the target device and improve the configuration table based on the information. That is, in the embodiments of the present disclosure, the transmission method of the host device may solve the problem that the transmission initiating device cannot obtain the device information of the to-be-transmitted devices. It should be noted that the embodiments of the present disclosure do not limit how the transmission initiating device select the target device by using the device information, which may be set according to actual application requirements.

Further, in order to facilitate the host device to perform transmission initialization configuration on the target device, the transmission initiating device is also required to improve the initial configuration table of the target device based on the device information. Only after the command register of the to-be-transmitted devices are configured to be enabled, and the interrupt configuration information required for the device during transmission is configured, the device may transmit data to the transmission initiating device. Furthermore, the device information of the to-be-transmitted devices usually includes information on whether the device needs to be enabled and information on interrupt types that the device may support. Thus, the transmission initiating device may fill in the corresponding enable configuration information and interrupt configuration information in the initial configuration table based on the device information of the target device. In order to facilitate identification and analysis, the initial configuration table may include a preset enable flag bit. When the transmission initiating device determines that the target device needs to be enabled, it may update the flag bit to a to-be-enabled status. For the interrupt configuration information, the initial configuration table may further include a target interrupt type and the interrupt configuration information, so that the transmission initiating device may fill in the desired interrupt type and the interrupt configuration information in the initial configuration table. It should be noted that the embodiments of the present disclosure do not limit interrupt types that the to-be-transmitted device may support, such as a message signal interrupt (MSI), or an MSI-X interrupt (MSI enhanced interrupt), or both of the above interrupt types. The embodiments of the present disclosure also do not limit specific interrupt configuration information, which may be refer to the relevant technology of interrupts. For example, for the MSI interrupt, the interrupt configuration information may be an MSI interrupt address, interrupt data, and a number of interrupts.

In one possible case, filling in the transmission configuration information in the initial configuration table of the target device to obtain the complete configuration table may include steps 21-25.

In step 21, the transmission initiating device determines whether the target device needs to be enabled based on the initial configuration table of the target device, if the target device needs to be enabled, the method proceeds to step 22; if the target device does not need to be enabled, the method proceeds to step 23.

In step 22, the preset enable flag bit in the initial configuration table is updated to the to-be-enabled status.

In Step 23, the interrupt types supported by the target device are read from the initial configuration table, and a target interrupt type is selected from the interrupt types and filled in the initial configuration table.

In step 24, if the target interrupt type is the MSI interrupt, the preset interrupt configuration information is filled in the initial configuration table, and the interrupt configuration information includes an MSI interrupt address, the interrupt data and the number of interrupts.

In step 25, the filled initial configuration table is set as the complete configuration table.

In S103, the host device configures the target device based on the transmission configuration information, updates a preset configuration status bit in the complete configuration table to a success status, and sends the updated complete configuration table to the transmission initiating device.

Correspondingly, after receiving the complete configuration table returned by the transmission initiating device, the host device performs initialization configuration on the target device based on the enable flag bit, the target interrupt type and the interrupt configuration information in the table. It should be noted that the embodiments of the present disclosure do not limit the specific interaction process between the host device and the configuration space of the target device, which may refer to the relevant technology of PCIe.

In one possible case, the host device configures the target device based on the transmission configuration information, which may include steps 31-33.

In step 31, the host device reads the enable flag, the target interrupt type and the interrupt configuration information from the transmission configuration information.

In step 32, if the enable flag bit is in the to-to-enabled status, the command register in the configuration space of the target device is configured to enable a memory space bit and a bus master bit.

In step 33, if the target interrupt type is the MSI interrupt, an MSI function register of the target device is configured by using the interrupt configuration information.

For the specific contents and specific setting methods of the command register, memory space bit, bus master bit and MSI function register (MSI capability structure), please refer to the relevant technology of PCIe device configuration space.

In the embodiment of the present disclosure, after the configuration is completed, a configuration status bit is also preset in the initial configuration table, so as to facilitate the host device to transmit back the information that the configuration is completed to the transmission initiating device. After completing the initialization configuration, the host device may update the status bit to the success status, so that the transmission initiating device may determine the initialization status of the target device based on the specific status information of the status bit.

Figure 2:
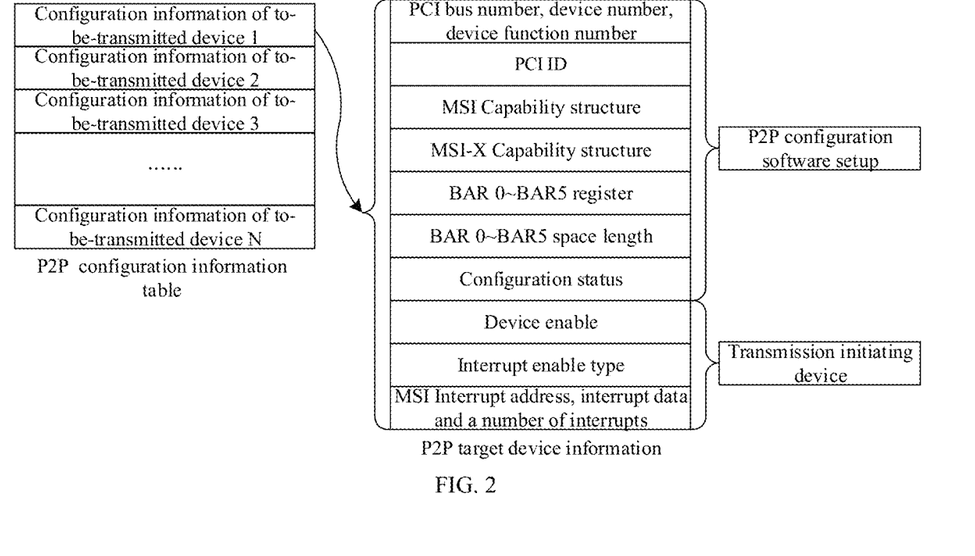
FIG. 2 is a schematic diagram of a complete configuration table provided in an embodiment of the present disclosure.

For ease of understanding, please refer to FIG. 2, FIG. 2 is a schematic diagram of a complete configuration table provided in an embodiment of the present disclosure, which includes:

1. location of the to-be-transmitted device on the host PCIe bus, including a PCI bus number, a device number and a device function number, which is used as identifiers of the to-be-transmitted devices to distinguish various target devices.

2. PCI ID of the to-be-transmitted device, including vendor ID, device ID, revision ID, and class code, which can be used by the transmission initiating device to determine whether the to-be-transmitted device is a desired target device type.

3. interrupt type support information of the to-be-transmitted device, including MSI and MSI-X compatibility information data structure (MSI Capability and MSI-X Capability) defined by the PCI device standard.

4. 6 BAR register values in the configuration space of the to-be-transmitted device. The mapping address of BAR space of the target device on the system bus and attributes of the BAR space may be obtained from the register, such as whether the address is 64 bit, and whether the attribute is a memory space. The P2P transmission of PCIe only supports the memory space, and does not support an Input/Output (I/O) space.

5. a length of each BAR space of the to-be-transmitted device.

6. configuration status bit, which is used by the host device to inform the transmission initiating device whether the target device is successfully configured.

7. an enable flag bit of the to-be-transmitted device, which is used by the transmission initiating device to inform the host whether the target device needs to be enabled.

8. interrupt enable type, which is used by the transmission initiating device to inform the host whether the target device enables an interrupt and a type of the enabled interrupt.

9. MSI interrupt information, which is used by the transmission initiating device to inform the host specific information about the MSI interrupt configuration of the target device.

Of the above, items 1 to 6 are set by the P2P configuration software in the host device, and items 7 to 9 are set by the transmission initiating device.

In S104, when the transmission initiating device determines that the configuration status bit is in the success status, the transmission initiating device perform PCIe point-to-point data transmission with the target device by using the complete configuration table.

Correspondingly, when the transmission initiating device determines that the configuration status bit is in the success status, the transmission initiating device perform PCIe point-to-point data transmission with the target device by using the complete configuration table. It should be noted that the embodiments of the present disclosure do not limit the specific process of the PCIe point-to-point data transmission, and the relevant technology of PCIe point-to-point data transmission may be referred to.

Based on the above embodiments, in the present disclosure, the device information of the to-be-transmitted devices may be held by the host device and saved in the corresponding initial configuration table. The host device may send the initial configuration table to the transmission initiating device, and the transmission initiating device may determine the target device in the to-be-transmitted devices based on the device information in the table, which not only facilitates the transmission initiating device to locate the target device, but also effectively solves the problem that the transmission initiating device cannot obtain the device information of the target device. After determining the target device, the transmission initiating device may continue to fill in the transmission configuration information necessary for the PCIe point-to-point data transmission in the initial configuration table of the target device to obtain the complete configuration table, and then send the complete configuration table back to the host device, and the host device configures the target device based on the transmission configuration information in the complete configuration table, which may effectively solve the problem that the transmission initiating device cannot configure the target device. Finally, after the configuration is completed, the host device may update the preset configuration status bit in the complete configuration table to the success status, so that the transmission initiating device initiates the PCIe point-to-point data transmission with the target device, which lays a foundation for autonomous data transmission between the transmission initiating device and the target device.

Based on the above embodiments, a communication process between the host device and the transmission initiating device is described in detail below. In one possible case, the host device sends the initial configuration table of the to-be-transmitted devices to the transmission initiating device, which may include S201-S202.

In S201, the host device constructs a first control command, sends the first control command to a control command submission queue, and updates a status of a doorbell register, where the first control command includes a storage address of the initial configuration table in a memory of the host device.

In the embodiments of the present disclosure, an NVMe interface and a preset control command (Admin command) are configured for processing the communication between the host device and the transmission initiating device. The first control command is configured for informing the transmission initiating device to extract all of initial figuration tables from the memory of the host device, which includes the storage address of the configuration table in the memory. After receiving the first control command, the transmission initiating device may extract the initial configuration table from the host device based on the storage address included in the first control command. It should be noted that the embodiments of the present disclosure do not limit the form of the first control command, which may be an extended command based on the Admin command defined by the NVMe standard, or a vendor-defined Admin command. For the convenience of setting, in the embodiments of the present disclosure, the Admin command defined by the NVMe standard is extended to obtain the control command used in the method. The first control command may be extended from the set feature command. The extension method may be as follows: setting the feature identifier of the set feature command to a preset value, so that the transmission initiating device recognizes the command. In addition, a PRP pointer of the set feature command is changed to the above storage address, so that the transmission initiating device extracts the storage address information. Further, since the NVMe interface is configured for data transmission, the host device and the transmission initiating device should comply with the communication method specified in the NVMe protocol. The host device should send the first control command to the control command submission queue (Admin SQ queue) and update the status value of the Doorbell register (Doorbell). When the transmission initiating device detects a status update in the doorbell register, it automatically extracts the first control command from the control command submission queue. It should be noted that the embodiments of the present disclosure do not limit the specific form of the control command submission queue, and the relevant technology of NVMe may be referred to.

In S202, the transmission initiating device extracts the first control command from the control command submission queue and obtains the initial configuration table from the memory based on the storage address when an update of the status of the doorbell register is detected.

Since the first control command is extended based on the set feature command, the transmission initiating device may also recognize and extract information from the received first control command based on a specific extension.

In one possible case, the first control command is a set feature command, and obtaining the initial configuration table from the memory based on the storage address includes steps 41-42.

In step 41, the transmission initiating device determines whether the feature identifier in the set feature command is the first preset value, the method proceeds to step 42 when the feature identifier in the set feature command is the first preset value, and the set feature command is discarded when the feature identifier in the set feature command is not the first preset value.

In step 42, the storage address is read from a data pointer of the set feature command, and the initial configuration table is obtained from the memory based on the storage address.

Of course, after obtaining the initial configuration table, the transmission initiating device may also return the execution result to the host device to inform the host device to perform subsequent operations. The transmission initiating device may return the execution result of the set feature command to the host device through a control command response queue (Admin CQ queue). It should be noted that the embodiments of the present disclosure do not limit the specific form of the control command response queue, and the relevant technology of NVMe may be referred to.

In one possible case, after obtaining the initial configuration table from the memory based on the storage address, the method further includes step 51.

In step 51, the transmission initiating device sends a first execution result of executing the set feature command to the host device through the control command response queue.

Correspondingly, sending the complete configuration table to the host device may include S301 and S302.

In S301, the host device constructs a second control command, sends the second control command to the control command submission queue, and updates the status of the doorbell register. The second control command includes a target write address of the complete configuration table in the memory.

In the embodiment of the present disclosure, the second control command is configured to inform the transmission initiating device to write the filled complete configuration table into the memory of the host device, and includes a target write address of the configuration table in the memory. The description of the specific form of the second control command is the same as the description of the first control command and will not be repeated herein. The second control command may be extended from a get feature command. The extension may be as follows: setting the feature identifier of the get feature command to a preset value, so that the transmission initiating device recognizes the command, and changing a PRP pointer of the get feature command to the above target write address, so that the transmission initiating device extracts the target write address information.

Similarly, when the second control command is transmitted, the host device and the transmission initiating device also comply with the provisions of NVMe standard.

In S302, the transmission initiating device extracts the second control command from the control command submission queue and writes the complete configuration table into the memory based on the target write address when a change of the status of the doorbell register is detected.

Since the second control command is extended based on the get feature command, the transmission initiating device may also recognize and extract information from the received second control command based on a specific extension.

In one possible case, the second control command is a get feature command, and writing the complete configuration table into the memory based on the target write address may include step 61 and step 62.

In step 61, the transmission initiating device determines whether the feature identifier in the get feature command is the second preset value, when the feature identifier in the get feature command is the second preset value, the method proceeds to step 62, and when the feature identifier in the get feature command is not the second preset value, the get feature command is discarded.

In step 62, the target write address is read from a data pointer of the get feature command, and the complete configuration table is written into the memory based on the target write address.

Of course, after writing the complete configuration table, the transmission initiating device may also return the execution result to the host device to inform the host device to perform subsequent operations.

In one possible case, after writing the complete configuration table into the memory based on the target write address, the method may further include step 71.

In step 71, the transmission initiating device sends the second execution result of executing the get feature command to the host device through the control command response queue.

Based on the above embodiments, in the present disclosure, an NVMe interface and customized control commands are configured for communication between the host device and the transmission initiating device, so as to ensure effective transmission of the initial configuration table and the complete configuration table.

A data transmission system, apparatus, electronic device, and non-transitory computer-readable storage medium provided in embodiments of the present application are described below. The data transmission system, apparatus, electronic device and non-transitory computer-readable storage medium described below may correspond to and refer to the above data transmission method.

Figure 3:
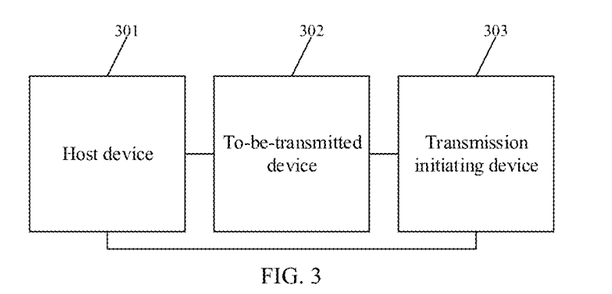
FIG. 3 is a structure block diagram of a data transmission system provided in an embodiment of the present disclosure.

Referring to FIG. 3, FIG. 3 shows a structure block diagram of a data transmission system provided in an embodiment of the present disclosure, the system may include a host device 301, to-be-transmitted devices 302 and a transmission initiating device 303, and the to-be-transmitted device 302 and the transmission initiating device 303 both being PCIe devices.

The host device 301 is configured for sending an initial configuration table of the to-be-transmitted devices 302 to the transmission initiating device 303, the initial configuration table including device information of the to-be-transmitted device 302, configuring the target device based on the transmission configuration information in the complete configuration table returned by the transmission initiating device 303, updating a preset configuration status bit in the complete configuration table to a success status, and sending the updated complete configuration table to the transmission initiating device 303.

The transmission initiating device 303 is configured for determining a target device in to-be-transmitted devices 302 based on the device information in the initial configuration table, filling in the transmission configuration information in the initial configuration table of the target device to obtain a complete configuration table, and sending the complete configuration table to the host device 301, and performing PCIe point-to-point data transmission with the target device by using the complete configuration table when the configuration status bit in the complete configuration table is determined to be in the success status.

The to-be-transmitted devices 302 are configured for performing PCIe point-to-point data transmission with the transmission initiating device 303 after being configured by the host device 301.

In some embodiments, the transmission initiating device 303 is further configured for determining whether the target device needs to be enabled based on the initial configuration table of the target device, updating an enable flag bit preset in the initial configuration table to a to-be-enabled status when the target device needs to be enabled, reading interrupt types supported by the target device from the initial configuration table, selecting a target interrupt type from the interrupt types, and filling in the target interrupt type in the initial configuration table, and filling in preset interrupt configuration information in the initial configuration table when the target interrupt type is the MSI interrupt, the interrupt configuration information including an MSI interrupt address, interrupt data and a number of interrupts, and setting the filled initial configuration table as the complete configuration table.

In some embodiments, the host device 301 is further configured for reading the enable flag bit, the target interrupt type and the interrupt configuration information from the transmission configuration information, configuring a command register in configuration space of the target device to enable a memory space bit and a bus master bit when the enable flag bit is in a to-be-enabled status, and configuring an MSI function register of the target device by using the interrupt configuration information when the target interrupt type is the MSI interrupt.

In some embodiments, the host device 301 is further configured for extracting the device information from configuration space of the to-be-transmitted device 302 and creating the initial configuration table by using the device information.

In some embodiments, the host device 301 is further configured for constructing a first control command, sending the first control command to a control command submission queue, and updating a status of a doorbell register, where the first control command includes a storage address of the initial configuration table in a memory of the host device 301.

The transmission initiating device 303 is further configured for extracting the first control command from the control command submission queue and obtaining the initial configuration table from the memory based on the storage address when an update of the status of the doorbell register is detected.

Correspondingly, the host device 301 is further configured for constructing a second control command, sending the second control command to the control command submission queue, and updating the status of the doorbell register, where the second control command includes a target write address of the complete configuration table in the memory.

The transmission initiating device 303 is further configured for extracting the second control command from the control command submission queue and writing the complete configuration table to the memory based on the target write address when a change of the status of the doorbell register is detected.

In some embodiments, the transmission initiating device 303 is further configured for determining whether the feature identifier in the set feature command is the first preset value, reading the storage address from a data pointer of the set feature command when the feature identifier in the set feature command is the first preset value, and obtaining the initial configuration table from the memory based on the storage address.

Correspondingly, the transmission initiating device 303 is further configured for determining whether the feature identifier in the get feature command is the second preset value, reading the target write address from a data pointer of the get feature command when the feature identifier in the get feature command is the second preset value, and writing the complete configuration table to the memory based on the target write address.

In some embodiments, the transmission initiating device 303 is further configured for sending a first execution result of executing the set feature command to the host device 301 through a control command response queue.

In some embodiments, the transmission initiating device 303 is further configured for sending a first execution result of executing the set feature command to the host device 301 through the control command response queue.

Correspondingly, the transmission initiating device 303 is further configured for sending a second execution result of executing the get feature command to the host device 301 through the control command response queue.

Figure 4:
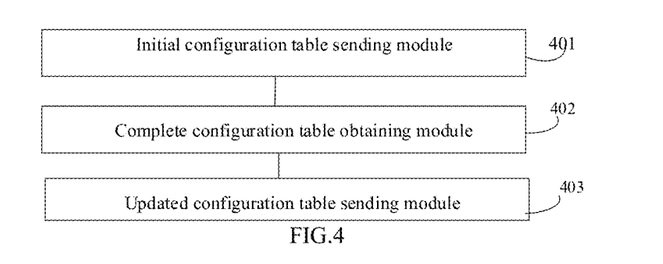
FIG. 4 is a structure block diagram of a data transmission apparatus provided in an embodiment of the present disclosure.

Referring to FIG. 4, the embodiment of the present disclosure also provides a data transmission apparatus applied to a host device in a data transmission system, the data transmission system includes a host device, to-be-transmitted devices and a transmission initiating device, and the apparatus may include:

an initial configuration table sending module 401 for sending an initial configuration table of the to-be-transmitted devices to the transmission initiating device, where the initial configuration table includes device information of the to-be-transmitted devices;

a complete configuration table obtaining module 402 for acquiring a complete configuration table sent by the transmission initiating device, where the complete configuration table is obtained by the transmission initiating device determining a target device in the to-be-transmitted devices based on the device information, and filling in the transmission configuration information in the initial configuration table of the target device; and an updated configuration table sending module 403 for configuring the target device based on the transmission configuration information, updating a preset configuration status bit in the complete configuration table to a success status, and sending the updated complete configuration table to the transmission initiating device, so that the transmission initiating device perform PCIe point-to-point data transmission with the target device by using the complete configuration table when the configuration status bit is determined to be in the success status.

In some embodiments, the updated configuration table sending module 403 may include:
 a first information reading module for reading the enable flag bit, the target interrupt type and interrupt configuration information from the transmission configuration information;
 a first processing module for configuring a command register in the configuration space of the target device to enable a memory space bit and a bus master bit when the enable flag bit is in a to-be-enabled status; and
 a second processing module for configuring an MSI function register of the target device by using the interrupt configuration information when the target interrupt type is an MSI interrupt.

In some embodiments, the apparatus may further include:
 an initial configuration table creating module for extracting device information from the configuration space of the to-be-transmitted devices and creating an initial configuration table by using the device information.

In some embodiments, the initial configuration table sending module 401 may include:
 a first control command constructing module for constructing a first control command, sending the first control command to a control command submission queue, and updating a status of the doorbell register, where the first control command include a storage address of the initial configuration table in a memory of the host device.

Accordingly, the complete configuration table obtaining module 402 may include:
 a second control command constructing module for constructing a second control command, sending the second control command to the control command submission queue, and updating the status of the doorbell register, where the second control command includes a target write address of the complete configuration table in the memory.

Figure 5:
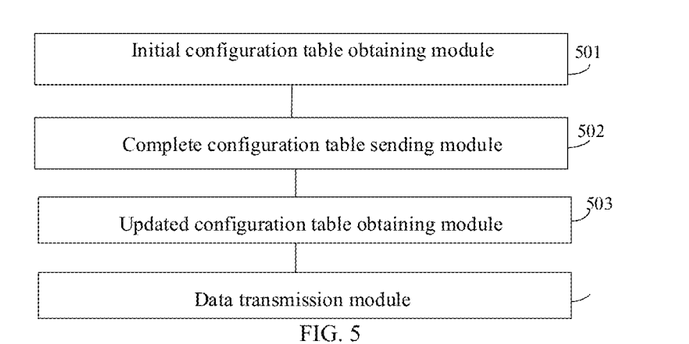
FIG. 5 is a structure block diagram of another data transmission apparatus provided in an embodiment of the present disclosure.

Referring to FIG. 5, an embodiment of the present disclosure also provides a data transmission apparatus applied to a transmission initiating device in a data transmission system, the data transmission system includes a host device, to-be-transmitted devices and a transmission initiating device, and the apparatus may include:

an initial configuration table obtaining module 501 for obtaining an initial configuration table of the to-be-transmitted devices which is sent by the host device, where the initial configuration table includes device information of the to-be-transmitted devices;

a complete configuration table sending module 502 for determining a target device in the to-be-transmitted devices based on the device information, filling in the transmission configuration information in the initial configuration table of the target device to obtain a complete configuration table, and sending the complete configuration table to the host device;

an updated configuration table obtaining module 503 for obtaining an updated complete configuration table sent by the host device, the complete configuration table being updated by the host device configuring the target device based on the transmission configuration information, and updating a preset configuration status in the complete configuration table to the success status; and a data transmission module 504 for performing PCIe point-to-point data transmission with the target device by using the complete configuration table when the configuration status bit is determined to be in the success status.

In some embodiments, the complete configuration table sending module 502 may include:

a first update processing module for determining whether the target device needs to be enabled based on an initial configuration table of the target device, and updating an enable flag preset in the initial configuration table to a to-be-enabled status when the target device needs to be enabled;

a second update processing module for reading interrupt types supported by the target device from the initial configuration table, selecting a target interrupt type from the interrupt types, and filling in the target interrupt type in the initial configuration table;

a third update processing module for filling in preset interrupt configuration information in an initial configuration table when the target interrupt type is an MSI interrupt, where the interrupt configuration information includes an MSI interrupt address, interrupt data, and a number of interrupts; and a fourth update processing module for setting the filled initial configuration table as the complete configuration table.

In some embodiments, the initial configuration table obtaining module 501 may include:

a first control command extracting module for extracting a first control command from a control command submission queue when an update of the status of the doorbell register is detected, where the first control command is sent to the control command submission queue by the host device, and the first control command includes a storage address of the initial configuration table in a memory of the host device;

an obtaining module for obtaining the initial configuration table from the memory based on the storage address.

Accordingly, the complete configuration table sending module 502 may include:

a second control command extracting module for extracting a second control command from a control command submission queue when a change of the status of the doorbell register is detected, where the second control command is sent to the control command submission queue by the host device, and the second control command includes a target write address of the complete configuration table in the memory; and a writing module for writing the complete configuration table into the memory based on the target write address.

In some embodiments, the first control command is a set feature command, and the obtaining module may be configured to determine whether the feature identifier in the set feature command is a first preset value, read the storage address from a data pointer of the set feature command when the feature identifier in the set feature command is the first preset value, and obtain the initial configuration table from the memory based on the storage address.

Correspondingly, the writing module may be configured to determine whether the feature identifier in the get feature command is the second preset value, read a target write address from a data pointer of the get feature command when the feature identifier in the get feature command is the second preset value, and write the complete configuration table into the memory based on the target write address.

In some embodiments, the acquiring module may also be configured to send the first execution result of executing the set feature command to the host device through a control command response queue.

Correspondingly, the writing module may also be configured to send a second execution result of executing the get feature command to the host device through a control command response queue.

Figure 6:
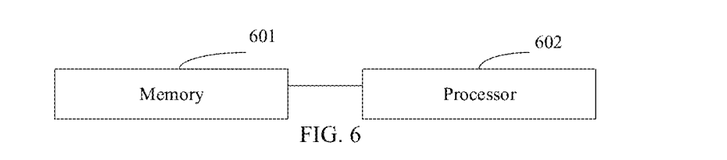
FIG. 6 is a structure block diagram of an electronic device provided in an embodiment of the present disclosure.

Referring to FIG. 6, an embodiment of the present disclosure further provides an electronic device including a memory 601 for storing a computer program and a processor 602 for executing the computer program to implement steps of the data transmission method of any one of the above embodiments.

Figure 7:
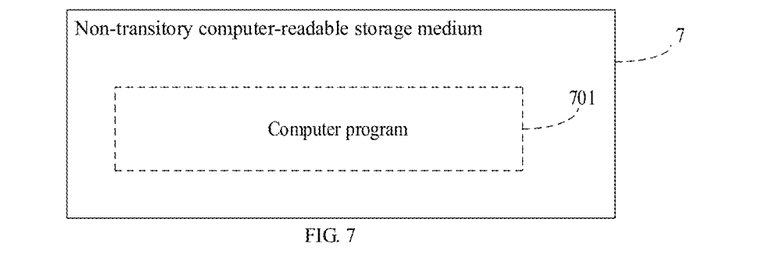
FIG. 7 is a structure block diagram of a non-transitory computer-readable storage medium provided in an embodiment of the present disclosure.

Referring to FIG. 7, an embodiment of the present disclosure further provides a non-transitory computer-readable storage medium 7 storing a computer program 701, and the computer program 701 implement the steps of the data transmission method of any one of the above embodiments when being executed by the processor.

Since the embodiments of the non-transitory computer-readable storage medium correspond to the embodiments of the data transmission method, the description of the embodiments of the data transmission method may be referred to for the embodiments of the non-transitory computer-readable storage medium, which will not be repeated here.

Each embodiment in the description is described in a progressive manner, and each embodiment focuses on the differences with other embodiments, and the same and similar parts of each embodiment may be referred to each other. For the apparatus disclosed in the embodiments, since it corresponds to the method disclosed in the embodiments, the description is relatively simple, and the description for the method can be referred to for the relevant parts.

The professional may further realize that the units and algorithm steps of various examples described in connection with the embodiments disclosed herein may be implemented in electronic hardware, computer software, or a combination of both. In order to clearly illustrate the interchangeability of hardware and software, the composition and steps of various examples have been described in the above description in general terms of functions. Whether these functions are performed in hardware or software depends on the particular application and design constraints of the technical solution. The professional may use different methods to implement the described functions for each particular application, but such implementations should not be considered beyond the scope of this application.

The steps of the methods or algorithms described in conjunction with the embodiments disclosed herein may be implemented directly in hardware, a software module executed by a processor, or a combination of both. The software module may be placed in random access memory (RAM), memory, read-only memory (ROM), electrically programmable ROM, electrically erasable programmable ROM, register, hard disk, removable disk, CD-ROM, or any other form of storage medium known in the art.

The above describes in detail the data transmission method, system, apparatus, device, and non-transient computer-readable storage medium provided in the present disclosure. The principle and embodiments of the present disclosure are illustrated with specific examples. The description of the above embodiments is merely intended to facilitate to understand the method of the present disclosure and its core concept. It should be noted that, for a person skilled in the art, without departing from the principle of the present disclosure, several improvements and modifications can be made to the present disclosure, which also fall within the protection scope of the claims of the present disclosure.

The invention claimed is:

1. A data transmission method applied to a data transmission system, wherein the data transmission system comprises a host device, to-be-transmitted devices and a transmission initiating device, the to-be-transmitted devices and the transmission initiating device are PCIe devices, and the method comprises:
    sending, by the host device, an initial configuration table of the to-be-transmitted devices to the transmission initiating device, wherein the initial configuration table comprises device information of the to-be-transmitted devices;
    determining, by the transmission initiating device, a target device in the to-be-transmitted devices based on the device information, filling in transmission configuration information in an initial configuration table of the target device to obtain a complete configuration table, and sending the complete configuration table to the host device; and obtaining, by the transmission initiating device, the device information of the to-be-transmitted devices through the initial configuration table, and selecting the target device and improving the configuration table based on the information;
    performing, by the host device, initialization configuration on the target device based on the enable flag bit, the target interrupt type and the interrupt configuration information in the table after receiving the complete configuration table returned by the transmission initiating device;
    configuring, by the host device, the target device based on the transmission configuration information, updating a configuration status bit preset in the complete configuration table to a success status, and sending the updated complete configuration table to the transmission initiating device; and
    performing, by the transmission initiating device, PCIe point-to-point data transmission with the target device by using the complete configuration table when the configuration status bit is determined to be in the success status;
    filling, by the transmission initiating device, in the corresponding enable configuration information and interrupt configuration information in the initial configuration table based on the device information of the target device; wherein the initial configuration table further comprises a target interrupt type and the interrupt configuration information, so that the transmission initiating device may fill in the desired interrupt type and the interrupt configuration information in the initial configuration table;
    wherein the filling in the transmission configuration information in the initial configuration table of the target device to obtain the complete configuration table comprises:
    determining, by the transmission initiating device, whether the target device needs to be enabled based on the initial configuration table of the target device;
    updating an enable flag bit preset in the initial configuration table to a to-be-enabled status when the target device needs to be enabled;
    reading interrupt types supported by the target device from the initial configuration table, selecting a target interrupt type from the interrupt types, and filling in the target interrupt type in the initial configuration table; wherein the target interrupt type comprises a message signal interrupt (MSI), or an MSI-X interrupt (MSI enhanced interrupt);
    filling in preset interrupt configuration information in the initial configuration table when the target interrupt type is an MSI interrupt, wherein the interrupt configuration information comprises an MSI interrupt address, interrupt data and a number of interrupts; and
    setting the filled initial configuration table as the complete configuration table.

2. The method according to claim 1, wherein the configuring, by the host device, the target device based on the transmission configuration information comprises:
    reading, by the host device, the enable flag bit, the target interrupt type and the interrupt configuration information from the transmission configuration information;
    configuring a command register in configuration space of the target device to enable a memory space bit and a bus master bit when the enable flag bit is in the to-be-enabled status; and
    configuring an MSI function register in the target device by using the interrupt configuration information when the target interrupt type is the MSI interrupt.

3. The method according to claim 1, wherein before sending, by the host device, the initial configuration table of the to-be-transmitted devices to the transmission initiating device, the method further comprises:
    extracting, by the host device, the device information from configuration space of the to-be-transmitted devices, and creating the initial configuration table by using the device information.

4. The method according to claim 1, wherein sending, by the host device, the initial configuration table of the to-be-transmitted devices to the transmission initiating device comprises:
    constructing, by the host device, a first control command, sending the first control command to a control command submission queue, and updating a status of a doorbell register, wherein the first control command comprises a storage address of the initial configuration table in a memory of the host device;
    extracting, by the transmission initiating device, the first control command from the control command submission queue, and obtaining the initial configuration table from the memory based on the storage address, when an update of the status of the doorbell register is detected; and
    the sending the complete configuration table to the host device comprises:

constructing, by the host device, a second control command, sending the second control command to the control command submission queue, and updating the status of the doorbell register, wherein the second control command comprises a target write address of the complete configuration table in the memory; and extracting, by the transmission initiating device, the second control command from the control command submission queue, and writing the complete configuration table into the memory based on the target write address, when a change of the status of the doorbell register status is detected.

5. The method according to claim 4, wherein the first control command is a set feature command, and the obtaining the initial configuration table from the memory based on the storage address comprises:

determining, by the transmission initiating device, whether a feature identifier in the set feature command is a first preset value;

reading the storage address from a data pointer of the set feature command and obtaining the initial configuration table from the memory based on the storage address when the feature identifier in the set feature command is the first preset value, and the second control command is a get feature command, and the writing the complete configuration table into the memory based on the target write address comprises:

determining, by the transmission initiating device, whether a feature identifier in the get feature command is a second preset value; and reading the target write address from a data pointer of the get feature command and writing the complete configuration table into the memory based on the target write address when the feature identifier in the get feature command is the second preset value.

6. The method according to claim 5, wherein after the obtaining the initial configuration table from the memory based on the storage address, the method further comprises:

sending, by the transmission initiating device, a first execution result of executing the set feature command to the host device through a control command response queue; and after the writing the complete configuration table into the memory based on the target write address, the method further comprises:

sending, by the transmission initiating device, a second execution result of executing the get feature command to the host device through the control command response queue.

7. A data transmission method applied to a host device in a data transmission system, wherein the data transmission system comprises a host device, to-be-transmitted devices and a transmission initiating device, and the method comprises:

sending an initial configuration table of the to-be-transmitted devices to the transmission initiating device, wherein the initial configuration table comprises device information of the to-be-transmitted devices;

obtaining, by the transmission initiating device, the device information of the to-be-transmitted devices through the initial configuration table, and selecting the target device and improving the configuration table based on the information;

performing, by the host device, initialization configuration on the target device based on the enable flag bit, the target interrupt type and the interrupt configuration information in the table after receiving the complete configuration table returned by the transmission initiating device;

obtaining a complete configuration table sent by the transmission initiating device, wherein the complete configuration table is obtained by the transmission initiating device determining a target device in the to-be-transmitted devices based on the device information and filling in transmission configuration information in an initial configuration table of the target device; and configuring the target device based on the transmission configuration information, updating a configuration status bit preset in the complete configuration table to a success status, and sending the updated complete configuration table to the transmission initiating device, so that the transmission initiating device performs PCIe point-to-point data transmission with the target device by using the complete configuration table when the configuration status bit is determined to be in the success status;

filling, by the transmission initiating device, in the corresponding enable configuration information and interrupt configuration information in the initial configuration table based on the device information of the target device; wherein the initial configuration table further comprises a target interrupt type and the interrupt configuration information, so that the transmission initiating device may fill in the desired interrupt type and the interrupt configuration information in the initial configuration table;

wherein the method further comprises:

determining, by the transmission initiating device, whether the target device needs to be enabled based on the initial configuration table of the target device;

updating an enable flag bit preset in the initial configuration table to a to-be-enabled status when the target device needs to be enabled;

reading interrupt types supported by the target device from the initial configuration table, selecting a target interrupt type from the interrupt types, and filling in the target interrupt type in the initial configuration table; wherein the target interrupt type comprises a message signal interrupt (MSI), or an MSI-X interrupt (MSI enhanced interrupt);

filling in preset interrupt configuration information in the initial configuration table when the target interrupt type is an MSI interrupt, wherein the interrupt configuration information comprises an MSI interrupt address, interrupt data and a number of interrupts; and setting the filled initial configuration table as the complete configuration table.

8. The method according to claim 7, wherein the configuring the target device based on the transmission configuration information comprises:

reading an enable flag bit, a target interrupt type and interrupt configuration information from the transmission configuration information;

configuring a command register in configuration space of the target device to enable a memory space bit and a bus master bit when the enable flag bit is in a to-be-enabled status; and configuring an MSI function register in the target device by using the interrupt configuration information when the target interrupt type is an MSI interrupt.

9. The method according to claim 7, wherein before the sending the initial configuration table of the to-be-transmitted devices to the transmission initiating device, the method further comprises:

extracting the device information from the configuration space of the to-be-transmitted devices and creating the initial configuration table by using the device information.

10. The method according to claim 7, wherein the sending the initial configuration table of the to-be-transmitted devices to the transmission initiating device comprises:

constructing a first control command, sending the first control command to a control command submission queue, and updating a status of a doorbell register, wherein the first control command comprises a storage address of the initial configuration table in a memory of the host device; and the obtaining the complete configuration table sent by the transmission initiating device comprises:

constructing a second control command, sending the second control command to the control command submission queue, and updating the status of the doorbell register, wherein the second control command comprises a target write address of the complete configuration table in the memory.

11. A data transmission system comprising a host device, to-be-transmitted devices and a transmission initiating device, wherein the to-be-transmitted devices and the transmission initiating device are PCIe devices, the host device is configured for sending an initial configuration table of the to-be-transmitted devices to the transmission initiating device, the initial configuration table comprising device information of the to-be-transmitted devices, configuring the target device based on transmission configuration information in a complete configuration table returned by the transmission initiating device, updating a configuration status bit preset in the complete configuration table to a success status, and sending the updated complete configuration table to the transmission initiating device; and obtaining, by the transmission initiating device, the device information of the to-be-transmitted devices through the initial configuration table, and selecting the target device and improving the configuration table based on the information; performing, by the host device, initialization configuration on the target device based on the enable flag bit, the target interrupt type and the interrupt configuration information in the table after receiving the complete configuration table returned by the transmission initiating device;

the transmission initiating device is configured for determining a target device in the to-be-transmitted devices based on the device information in the initial configuration table, filling in the transmission configuration information in the initial configuration table of the target device to obtain a complete configuration table, sending the complete configuration table to the host device, and performing PCIe point-to-point data transmission with the target device by using the complete configuration table when the configuration status bit in the complete configuration table is determined to be in the success status; and the to-be-transmitted devices are configured for performing PCIe point-to-point data transmission with the transmission initiating device after being configured by the host device;

the transmission initiating device is further configured for filling in the corresponding enable configuration information and interrupt configuration information in the initial configuration table based on the device information of the target device; wherein the initial configuration table further comprises a target interrupt type and the interrupt configuration information, so that the transmission initiating device may fill in the desired interrupt type and the interrupt configuration information in the initial configuration table;

and the transmission initiating device is further configured for determining whether the target device needs to be enabled based on the initial configuration table of the target device, updating an enable flag bit preset in the initial configuration table to a to-be-enabled status when the target device needs to be enabled, reading interrupt types supported by the target device from the initial configuration table, selecting a target interrupt type from the interrupt types, filling in the target interrupt type in the initial configuration table, filling in preset interrupt configuration information in the initial configuration table when the target interrupt type is an MSI interrupt, the interrupt configuration information comprising an MSI interrupt address, interrupt data and a number of interrupts, and setting the filled initial configuration table as the complete configuration table; wherein the target interrupt type comprises a message signal interrupt (MSI), or an MSI-X interrupt (MSI enhanced interrupt).

12. The data transmission system according to claim 11, wherein the host device is further configured for reading the enable flag bit, the target interrupt type and the interrupt configuration information from the transmission configuration information, configuring a command register in configuration space of the target device to enable a memory space bit and a bus master bit when the enable flag bit is in the to-be-enabled status, and configuring an MSI function register in the target device by using the interrupt configuration information when the target interrupt type is the MSI interrupt.

13. The data transmission system according to claim 11, wherein the host device is further configured for extracting the device information from configuration space of the to-be-transmitted devices and creating the initial configuration table by using the device information.

14. The data transmission system according to claim 11, wherein the host device is further configured for constructing a first control command, sending the first control command to a control command submission queue, and updating a status of a doorbell register, and the first control command comprises a storage address of the initial configuration table in a memory of the host device;

the transmission initiating device is further configured for extracting the first control command from the control command submission queue and obtaining the initial configuration table from the memory based on the storage address when an update of the status of the doorbell register is detected;

the host device is further configured for constructing a second control command, sending the second control command to the control command submission queue, and updating the status of the doorbell register, and the second control command comprises a target write address of the complete configuration table in the memory; and the transmission initiating device is further configured for extracting the second control command from the control command submission queue and writing the complete configuration table into the memory based on the target write address when a change of the status of the doorbell register is detected.

15. The data transmission system according to claim 14, wherein the transmission initiating apparatus is further configured for determining whether a feature identifier in the set feature command is a first preset value, and reading the storage address from a data pointer of the set feature command and obtaining the initial configuration table from the memory based on the storage address when the feature identifier in the set feature command is the first preset value; and the transmission initiating device is further configured for determining whether the functional identifier in the get feature command is a second preset value, and reading the target write address from a data pointer of the get feature command and writing the complete configuration table into the memory based on the target write address when the functional identifier in the get feature command is the second preset value.

16. The data transmission system according to claim 15, wherein the transmission initiating device is further configured for sending a first execution result of executing the set feature command to the host device through a control command response queue; and the transmission initiating device is further configured for sending a second execution result of executing the get feature command to the host device through the control command response queue.

17. An electronic device, comprising:
a memory for storing a computer program; and
a processor for executing the computer program to implement the data transmission method according to claim 7.

18. A non-transitory computer-readable storage medium storing a computer program, wherein the computer program, when loaded and executed by the processor, implements the data transmission method according to claim 1.

* * * * *